(12) United States Patent
Horiuchi et al.

(10) Patent No.: US 11,050,452 B2
(45) Date of Patent: Jun. 29, 2021

(54) ELECTRONIC DEVICES HAVING CIRCUITRY IN HOUSING ATTACHMENT STRUCTURES

(71) Applicant: Apple Inc., Cupertino, CA (US)

(72) Inventors: James G. Horiuchi, Sunnyvale, CA (US); Tyler S. Bushnell, Mountain View, CA (US); Brad G. Boozer, Saratoga, CA (US); Mario Martinis, Cupertino, CA (US); YoungHoon Kim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/589,643

(22) Filed: Oct. 1, 2019

(65) Prior Publication Data

US 2020/0186179 A1 Jun. 11, 2020

Related U.S. Application Data

(60) Provisional application No. 62/776,360, filed on Dec. 6, 2018.

(51) Int. Cl.
*H04B 1/3827* (2015.01)
*H01Q 1/24* (2006.01)
*G06F 3/044* (2006.01)
*H01Q 1/27* (2006.01)

(52) U.S. Cl.
CPC ........... *H04B 1/385* (2013.01); *G06F 3/0447* (2019.05); *H01Q 1/24* (2013.01); *H01Q 1/273* (2013.01); *G06F 2203/04102* (2013.01)

(58) Field of Classification Search
CPC ........ H04B 1/385; H04B 1/3888; H01Q 1/24; H01Q 1/273; H01Q 21/06; H01Q 1/405; H01Q 13/10; H01Q 19/30; H01Q 9/16; H01Q 9/42; H01Q 9/0407; G06F 3/0447;
(Continued)

(56) References Cited

U.S. PATENT DOCUMENTS 7,262,737 B2 * 8/2007 Zarnowitz .............. H01Q 1/088
343/702
8,280,682 B2 10/2012 Vock et al.
8,538,345 B2 9/2013 Mohammadian
(Continued)

FOREIGN PATENT DOCUMENTS

EP 1490925 B1 3/2008

*Primary Examiner* — Lewis G West
(74) *Attorney, Agent, or Firm* — Treyz Law Group, P.C.; G. Victor Treyz; Tianyi He

(57) ABSTRACT

An electronic device housing may be formed from housing members. A first housing member may form a display cover layer that overlaps pixels. During operation, the pixels may display an image that is viewable through the display cover layer. The second housing member may have a rear wall portion and a sidewall. A band may be coupled to the sidewall or other portion of the second housing member. The first and second housing members may be attached together using a housing member attachment structure. The housing member attachment structure may have layers of adhesive and printed circuit structures. The printed circuit structures may include metal traces that form an antenna and that form capacitive force sensor electrodes on opposing sides of a compressible member.

18 Claims, 11 Drawing Sheets

(58) Field of Classification Search
CPC ......... G06F 2203/04102; G06F 1/1652; G06F 1/1698
See application file for complete search history.

(56) References Cited

U.S. PATENT DOCUMENTS

| | | | | |
|---|---|---|---|---|
| 8,855,730 | B2* | 10/2014 | Sanford | H01Q 1/428 455/575.7 |
| 9,196,952 | B2 | 11/2015 | Tran et al. | |
| 9,444,141 | B2 | 9/2016 | Asrani et al. | |
| 9,703,272 | B2 | 7/2017 | Fraser et al. | |
| 10,008,766 | B2* | 6/2018 | Li | H05K 1/028 |
| 10,122,837 | B2* | 11/2018 | Tsai | H01Q 1/44 |
| 10,249,944 | B1* | 4/2019 | Ng | H01Q 1/44 |
| 10,281,953 | B2 | 5/2019 | von Badinski et al. | |
| 10,418,693 | B2 | 9/2019 | Xu et al. | |
| 10,484,958 | B2 | 11/2019 | Sayem et al. | |
| 10,622,703 | B2* | 4/2020 | Hong | H01Q 1/44 |
| 2007/0035454 | A1* | 2/2007 | Zarnowitz | H01Q 1/244 343/702 |
| 2007/0041275 | A1 | 2/2007 | Barras et al. | |
| 2011/0273394 | A1* | 11/2011 | Young | G06F 3/047 345/174 |
| 2012/0009983 | A1* | 1/2012 | Mow | H04B 1/40 455/575.7 |
| 2012/0034888 | A1* | 2/2012 | De Flaviis | G06F 3/044 455/129 |
| 2015/0178532 | A1 | 6/2015 | Brulé | |
| 2016/0041663 | A1* | 2/2016 | Chen | G09G 3/32 345/174 |
| 2016/0328068 | A1* | 11/2016 | Ba-Tis | H02N 1/002 |
| 2017/0102809 | A1* | 4/2017 | Son | G06F 3/0414 |
| 2017/0242506 | A1* | 8/2017 | Patel | G06F 3/0443 |
| 2018/0090826 | A1 | 3/2018 | Da Costa Bras Lima et al. | |
| 2019/0081387 | A1* | 3/2019 | Pandya | H04M 1/0266 |
| 2019/0123439 | A1 | 4/2019 | Katz | |
| 2019/0334523 | A1* | 10/2019 | Frescas | C08L 33/16 |
| 2019/0372209 | A1* | 12/2019 | Wong | H01Q 9/26 |
| 2020/0044323 | A1* | 2/2020 | Oesch | H01Q 7/00 |
| 2020/0144724 | A1* | 5/2020 | Farkas | H01Q 9/0471 |
| 2020/0183511 | A1* | 6/2020 | Frescas | G06F 3/041 |
| 2020/0251820 | A1* | 8/2020 | Ruaro | H01Q 1/528 |

\* cited by examiner

ELECTRONIC DEVICES HAVING CIRCUITRY IN HOUSING ATTACHMENT STRUCTURES

This application claims the benefit of provisional patent application No. 62/776,360, filed Dec. 6, 2018, which is hereby incorporated by reference herein in its entirety

FIELD

This relates generally to electronic devices, and, more particularly, to electronic devices with wireless communications circuitry.

BACKGROUND

Electronic devices are often provided with wireless communications capabilities. To satisfy consumer demand for small form factor wireless devices, it may be desirable to form antennas in compact electronic device enclosures. This can make it difficult to achieve desired antenna performance goals. For example, it can be challenging to achieve satisfactory antenna coverage in devices with conductive electronic device housing structures.

SUMMARY

An electronic device may have a housing. The housing may surround electrical components in an interior region of the electronic device. The electrical components may include sensors, displays, and other input-output devices, control circuitry, and communications circuitry such as radio-frequency transceiver circuitry for handling antenna signals.

The electronic device may have opposing front and rear faces. A display may be provided on the front face. A first housing member may form a transparent display cover layer that overlaps an array of pixels in the display so that images on the array of pixels can be viewed through the transparent display cover layer. A second housing member may have a sidewall portion that extends between housing structures on the front and rear faces. If desired, a band may be coupled to the sidewall portion or other portion of the second housing member.

The first and second housing members may be attached to each other to form the housing for the electronic device. The first and second housing members may, for example, be joined together using a housing member attachment structure. The housing member attachment structure may have layers of adhesive and one or more printed circuits. In an illustrative arrangement, the housing member attachment structure may be used to attach a surface of the display cover layer to an opposing portion of a housing sidewall.

The housing member attachment structure may include printed circuit structures. The printed circuit structures may include polymer substrate structures with metal traces. The metal traces on the printed circuit structures may include metal traces that form an antenna that is electrically coupled to the radio-frequency transceiver circuitry. The metal traces on the printed circuit structures may also form first and second force sensor electrodes. The force sensor electrodes may be capacitive force sensor structures for a capacitive force sensor and may be formed on opposing sides of a compressible member such as an elastomeric member in the housing member attachment structure.

DETAILED DESCRIPTION

Electronic devices may be provided with wireless communications circuitry. The wireless communications circuitry may include antennas having antenna resonating elements formed from metal traces on polymer substrates such as flexible printed circuit substrates and other supporting structures. The antenna structures of the wireless communications circuitry may be incorporated into a housing member attachment structure. The housing member attachment structure may be used in joining housing structures together. For example, the housing member attachment structure may be used in attaching a first housing member such as a display cover layer to a second housing member such as a housing sidewall or may be used to couple a housing member such as a housing sidewall structure to a housing member such as a rear housing wall structure. The housing member attachment structure may include adhesive for attaching one housing member to another.

In some configurations, a housing member attachment structure may include a capacitive force sensor. The force sensor may have capacitive sensor electrodes that are formed from patterned metal layers on the flexible printed circuits and other substrates that are used in forming the antennas. For example, a housing member attachment structure may include flexible printed circuit structures or other flexible polymer substrates with metal traces that serve both as antenna resonating element structures and force sensor electrode structures. Configurations in which a housing member attachment structure includes an antenna resonating element and does not include force sensor structures may also be used.

Figure 1:
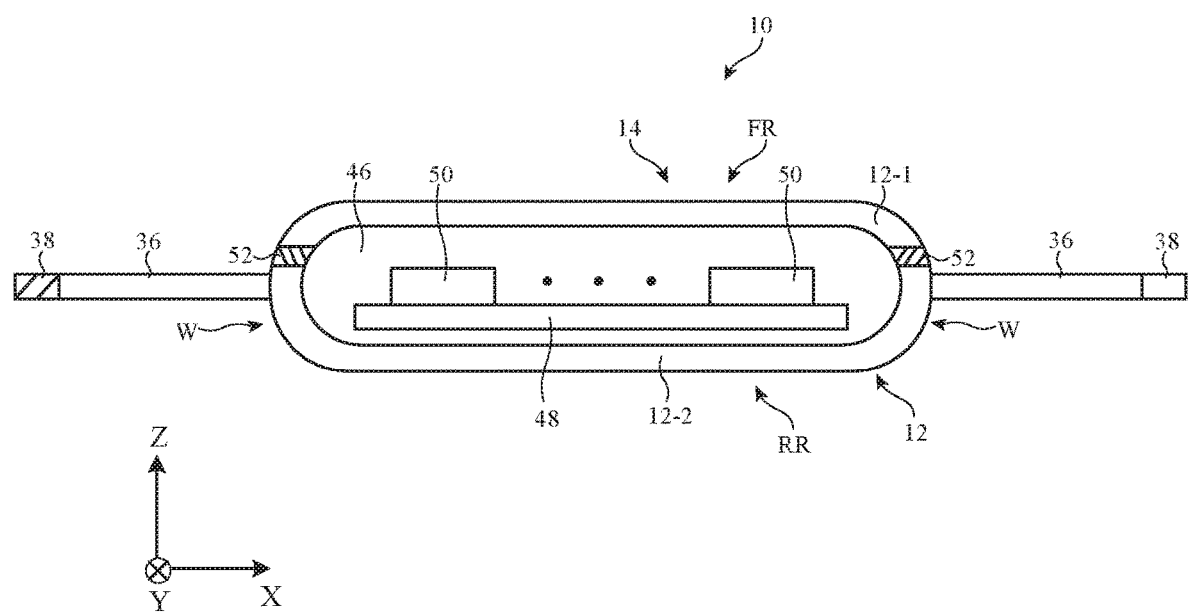
FIG. 1 is a cross-sectional side view of an illustrative electronic device in accordance with an embodiment.

FIG. 1 is a cross-sectional side view of an illustrative electronic device. Device 10 may have a housing such as housing 12. Housing 12 may have opposing front and rear faces FR and RR and sidewalls W. As shown in FIG. 1, housing 12 may enclose interior 46 of device 10. Device 10 may include electrical components 50 in interior 46 (e.g., integrated circuits, sensors and other input-output devices, control circuitry, display layers such as organic light-emitting diode panels or other display layers, etc.). Electrical components 50 may, if desired, be mounted on printed circuits such as printed circuit 48 (e.g., flexible printed circuits and/or printed circuits formed from rigid printed circuit board material). In some configurations, a display may be formed on rear face RR. In other configurations, no display is present on rear face RR. In configurations in which no display is present on rear face RR, the portion of housing 12 on rear face RR may be formed from metal (e.g., a stainless steel or aluminum layer) and/or transparent structures (e.g., glass, sapphire, etc.). For example, housing 12 on rear face RR may be formed from glass that is covered with opaque material (e.g., ink) and/or may be formed from metal with openings in which glass, sapphire, or other transparent window structures are formed. If desired, device 10 may have a rear housing wall formed from metal with optional optical windows and may have optional metal sidewall portions that extend upwardly from the rear housing wall to form sidewall W.

Device 10 may be a wristwatch device having a main unit (control unit) formed from housing 12 and the components in interior 46 of housing 12 and a band such as band 36 (sometimes referred to as a strap, wearable band, wrist band, etc.) that is configured to be worn on a body part of a user such as a user's wrist. Display 14 may be coupled to housing 12 of the main unit (e.g., display 14 may be mounted on front face FR). Control circuitry, communications circuitry, and input-output devices may be housed in interior 46 of the main unit (e.g., an interior region formed by housing 12). Band 36 may be coupled to sidewall W. For example, band 36 may have a first portion coupled to one side of housing 12 (e.g., a metal sidewall and/or rear housing wall or other housing structure in the housing of the main unit) and a second portion coupled to an opposing side of housing 12 (e.g., a metal sidewall and/or rear housing wall or other housing structure on an opposing side of the housing of the main unit). Clasps 38 may be formed at the ends of the first and second portions, respectively. When band 36 is wrapped around a user's wrist, clasps 38 may mate to secure device 10 to the user's wrist. Clasps 38 may be magnetic clasps, clasps formed from mating clasp mechanisms (e.g., tangs and holes), hook-and-loop fasteners, or other structures for closing band 36 around a user's wrist or other body part.

Band 36 may be flexible, which allows band 36 to be wrapped around a user's wrist. For example, band 36 may be formed from fabric, flexible polymer, leather, or other flexible materials, and/or band 36 may have multiple hinged segments. The hinged segments, which may sometimes be referred to as band segments or links, may be formed from rigid materials (glass, rigid polymer, metal, etc.) and/or may be formed from flexible materials (e.g., fabric, flexible polymer, etc.). Hinges may be provided between adjacent links in band 36 and may include metal hinges, fabric hinges, hinges formed from polymer and/or metal or other materials, and/or other hinge structures. The hinges may be used to allow band segments to rotate with respect to each other and with respect to the main unit of device 10. If desired, band 36 may be detachable.

Housing 12 of device 10 may have multiple portions. For example, housing 12 may have a first portion such as portion 12-1 and a second portion such as portion 12-2 (as an example). Separate housing portions of device 10 may be coupled using housing member attachment structures such as housing member attachment structure 52 of FIG. 1. Housing member attachment structure 52, which may sometimes be referred to as a housing member joining structure, housing member coupling structure, housing attachment structure, etc., may include adhesive and other structures for joining housing structures together. For example, housing member attachment structure 52 of FIG. 1 may have a ring shape or other suitable shape that joins portions 12-1 and 12-2 and thereby holds these separate housing portions together to form housing 12 for device 10.

Housing member attachment structure 52 may include adhesive for joining members 12-1 and 12-2. To enhance device functionality, circuitry may be embedded in housing member attachment structure 52. For example, printed circuit substrates or other substrates with metal traces for forming force sensor circuitry and/or antenna circuitry may be incorporated into housing member attachment structure 52. In some configurations, antenna circuitry may be mounted on protruding portions of these substrates (e.g., portions of a polymer substrate such as a printed circuit substrate or other supporting structure in housing member attachment structure 52 that protrudes outwardly from the joint between adjacent housing members).

Figure 2:
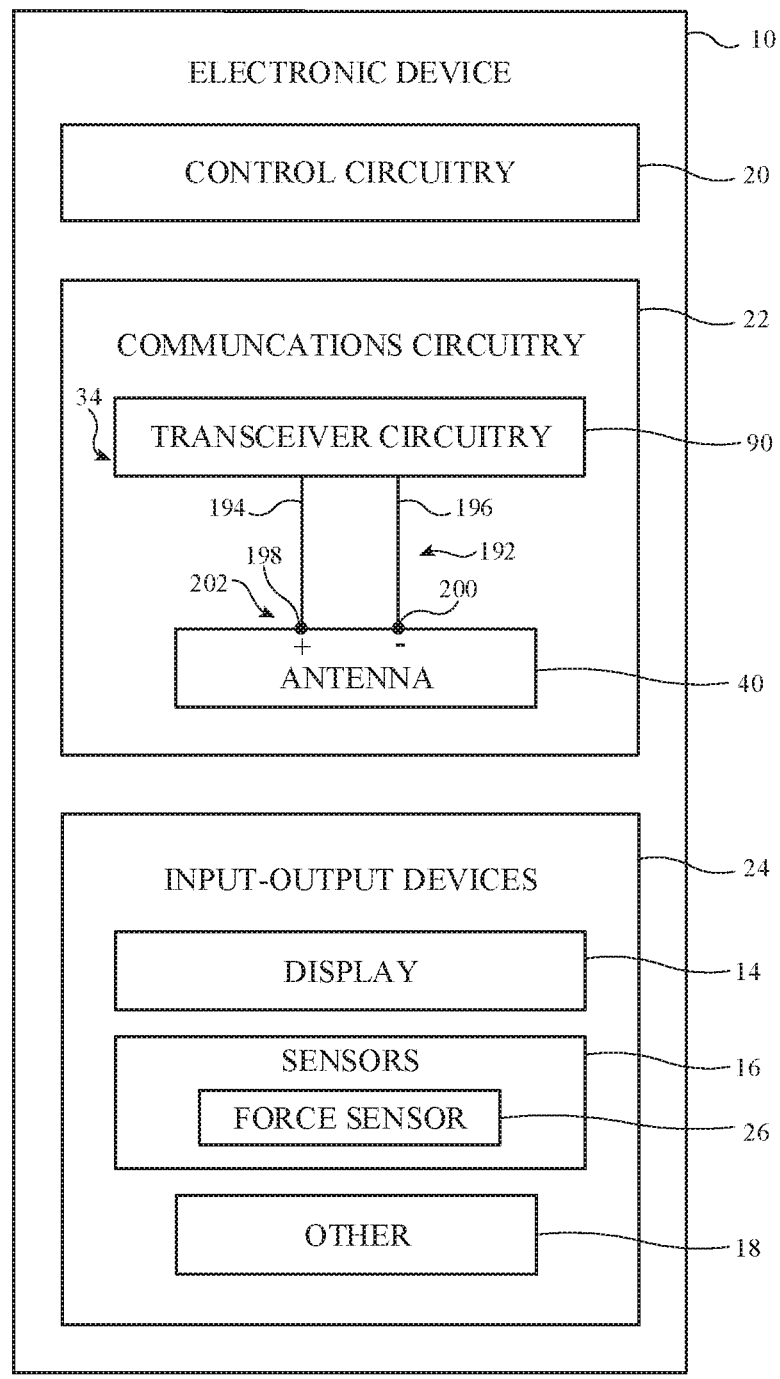
FIG. 2 is a schematic diagram of an illustrative electronic device in accordance with an embodiment.

A schematic diagram of an illustrative electronic device such as device 10 of FIG. 1 with housing attachment structures having circuitry such as wireless communications and force sensing circuitry is shown in FIG. 2. Device 10 may be a cellular telephone, tablet computer, laptop computer, wristwatch device or other wearable device, a television, a stand-alone computer display or other monitor, a computer display with an embedded computer (e.g., a desktop computer), a system embedded in a vehicle, kiosk, or other embedded electronic device, a media player, or other electronic equipment.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between device 10 and external equipment, control circuitry 20 may communicate using communications circuitry 22. Circuitry 22, which may sometimes be referred to as control circuitry and/or control and communications circuitry, may include wireless communications circuitry 34 to support bidirectional wireless communications between device 10 and external equipment over a wireless link. Circuitry 22 may also support wired communications.

Wireless communications circuitry 34 may include radio-frequency (RF) transceiver circuitry 90 formed from one or more integrated circuits, power amplifier circuitry, low-noise input amplifiers, passive RF components, one or more antennas such as antenna 40, transmission lines such as transmission line 192, and other circuitry for handling RF wireless signals.

Radio-frequency transceiver circuitry 90 may include wireless local area network transceiver circuitry to handle 2.4 GHz and 5 GHz bands for WiFi® (IEEE 802.11) communications and may include Bluetooth® circuitry to handle the 2.4 GHz Bluetooth® communications band. If desired, circuitry 90 may handle other bands such as cellular telephone bands (e.g., bands from 700-2700 MHz and/or other cellular telephone frequencies), near-field communications bands (e.g., 13.56 MHz), millimeter wave bands (e.g., communications at 10-400 GHz such as communications at a 60 GHz millimeter wave communications band), and/or other communications bands. Configurations in which radio-frequency transceiver circuitry 90 handles wireless local area network bands (e.g., 2.4 GHz and 5 GHz) may sometimes be described herein as an example. In general, however, circuitry 90 may be configured to cover any suitable communications bands of interest.

Wireless circuitry 34 may include one or more antennas such as antenna 40. Antennas such as antenna 40 may be formed using any suitable antenna types. For example, antennas in device 10 may include antennas with resonating elements that are formed from loop antenna structures, patch antenna structures, inverted-F antenna structures, open and closed slot antenna structures, planar inverted-F antenna structures, helical antenna structures, monopole antennas, dipoles, Yagi (Yagi-Uda) antenna structures, hybrids of these designs, etc. If desired, one or more antennas 40 may be cavity backed antennas. Parasitic elements and directors may be included in antennas 40 to adjust antenna performance. In some configurations, device 10 may have isolation elements between respective antennas 40 to help avoid antenna-to-antenna cross-talk. Different types of antennas may be used for different bands and combinations of bands. For example, one type of antenna may be used in forming a local wireless link antenna and another type of antenna may be used in forming a remote wireless link antenna. In some configurations, different antennas may be used in handling different bands for transceiver circuitry 90. Each antenna 40 may cover one or more bands. As an example, antennas in circuitry 34 may include dual band wireless local area network antennas.

Each antenna 40 in device 10 may be coupled to transceiver circuitry 90 using an antenna feed. As shown in FIG. 2, radio-frequency transceiver circuitry 90 may be coupled to antenna feed 202 of antenna 40 using transmission line 192. Antenna feed 202 may include a positive antenna feed terminal such as positive antenna feed terminal 198 and may have a ground antenna feed terminal such as ground antenna feed terminal 200. Transmission line 192 may be formed from metal traces on a printed circuit (e.g., a rigid printed circuit formed from fiberglass-filled epoxy or other rigid printed circuit material or a flexible printed circuit formed from a layer of polyimide or a sheet of other flexible printed circuit substrate material) or may be formed from other conductive structures and may have a positive transmission line signal path such as path 194 that is coupled to terminal 198 and a ground transmission line signal path such as path 196 that is coupled to terminal 200. Transmission line paths such as path 192 may be used to route antenna signals within device 10. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within transmission lines such as transmission line 192 and/or circuits such as these may be incorporated into antenna 40 (e.g., to support antenna tuning, to support operation in desired frequency bands, etc.). During operation, control circuitry 20 may use transceiver circuitry 90 and antenna(s) 40 to transmit and receive data wirelessly. Control circuitry 20 may, for example, receive streaming media wirelessly using transceiver circuitry 90 and antenna(s) 40 and may play the media through a speaker in device 10, may handle cellular telephone calls, may transmit and receive text messages, email messages, and other messages, and/or may perform other communications tasks.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Display 14 may have an array of pixels configured to display images for a user. The display pixels may be formed on one or more substrates such as one or more flexible substrates (e.g., display 14 may be formed from a flexible display layer). Conductive electrodes for a capacitive touch sensor in display 14 and/or an array of indium tin oxide electrodes or other transparent conductive electrodes overlapping display 14 may be used to form a two-dimensional capacitive touch sensor for display 14 (e.g., display 14 may be a touch sensitive display).

Sensors 16 in input-output devices 24 may include force sensors such as force sensor 26. Force sensors such as force sensor 26 may include strain gauges, capacitive force sensors, resistive force sensors, or other force sensors. Sensors 16 may also include audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry. Device 10 may, if desired, include power circuits for transmitting and/or receiving wired and/or wireless power and charging batteries or other energy storage devices in device 10. For example, device 10 may include a coil and rectifier to receive wireless power that is provided to circuitry in device 10.

Figure 3:
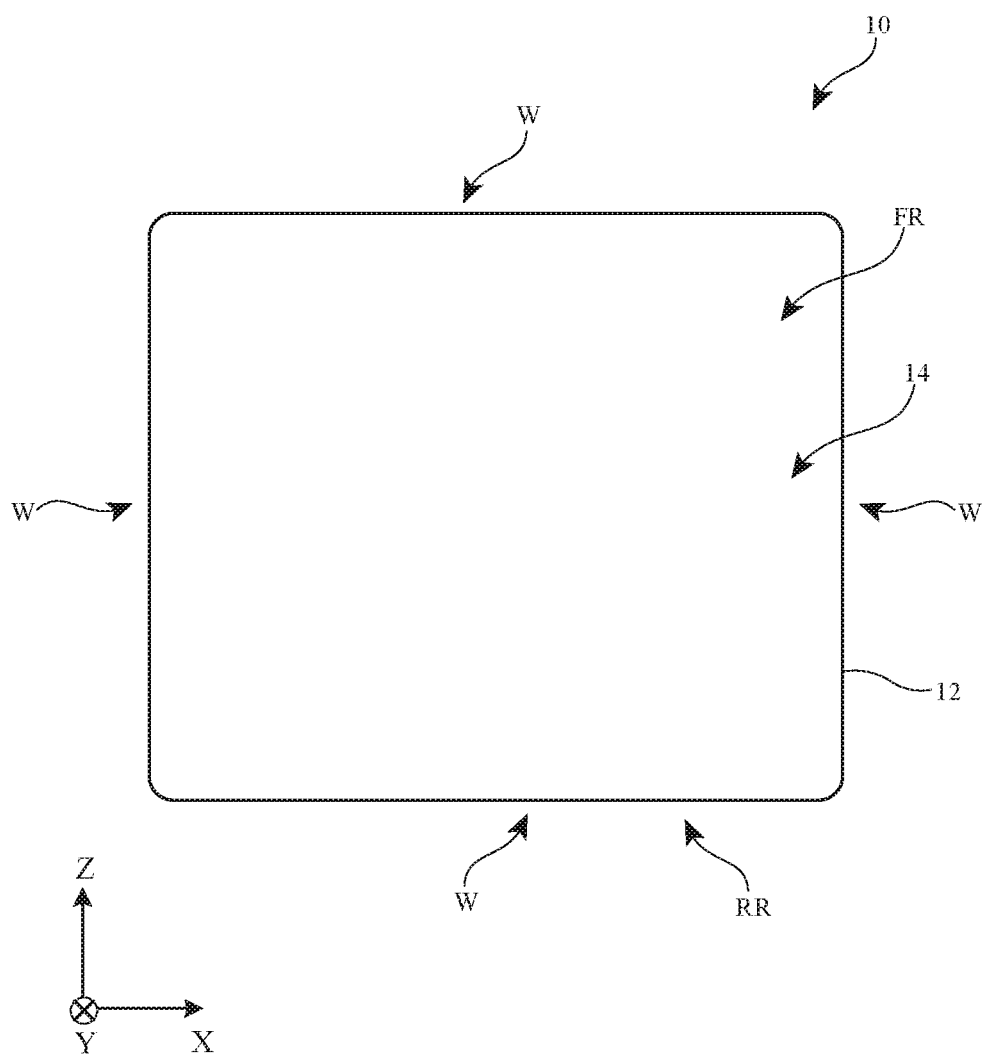
FIG. 3 is a front view of an illustrative electronic device in accordance with an embodiment.

A front (plan) view of an illustrative electronic device is shown in FIG. 3. As shown in FIG. 3, device 10 may include housing 12. Housing 12 may include structures formed from glass, polymer, metal, wood or other natural materials, sapphire or other crystalline material, ceramic, fabric, other materials, and/or combinations of these materials. Device 10 may have a front face FR, an opposing rear face RR, and a sidewall W that runs around the peripheral edge of device 10 and that extends between front face FR and rear face RR. The upper and opposing lower edges of device 10 may run parallel to each other and parallel to the X axis of FIG. 2. The opposing left and right edges may run parallel to each other and parallel to the Y axis of FIG. 2. The portions of housing 12 on front face FR and rear face RR may be planar (e.g., two parallel planes offset by a distance along the Z axis) and/or may include curved portions. For example, the outer surfaces (and, if desired, the inner surfaces) of housing 12 on front face FR and rear face RR may have curved cross-sectional profiles. If desired, a band such as band 36 may be coupled to housing 12.

In the example of FIG. 3, display 14 covers front face FR. Portions of display 14 may also cover some or all of sidewall W. Rear face RR may be free of display pixels and/or may be partly or fully covered by pixels that display an image. In addition to housing structures that cover front face FR, rear face RR, and sidewall W, housing 12 may have portions that form internal supporting structures (e.g., a frame, midplate member, etc.).

In some arrangements, housing 12 has transparent structures (e.g., clear glass, polymer, sapphire, etc.) that overlap light-emitting components. For example, a rectangular housing member with rounded corners or other transparent portion of housing 12 may serve as a display cover layer that covers pixels in display 14. The display cover layer may cover front face FR and, if desired, other portions of device 10 (e.g., part or all of sidewall W, part or all of rear face RR, etc.).

In an illustrative configuration, housing 12 may have a transparent display cover layer that overlaps display 14 on front face FR and at least part of sidewall W and may have transparent window structures that overlap optical components (e.g., a heart rate sensor with a light-emitting diode and photodetector and/or other light-emitting and/or light detecting devices). Other portions of housing 12 may be formed from opaque material (e.g., metal, etc.). Other arrangements may be used if desired (e.g., arrangements in which some or all of rear face RR contains an array of pixels for displaying an image, etc.). Touch sensor circuitry such as two-dimensional capacitive touch sensor circuitry may be incorporated into display 14 as a separate touch sensor panel overlapping display pixels or as part of a display panel forming display 14.

Device 10 of FIG. 3 has a rectangular outline (e.g., a square periphery) with four rounded corners. If desired, device 10 may have other shapes. For example, device 10 may have a shape that folds and unfolds along a bend (folding) axis (e.g., using a hinge to couple portions of housing 12) and may include a display that overlaps or that does not overlap the bend axis, may have a shape with an oval footprint or circular outline, may have a cubic shape, may have a pyramidal, cylindrical, spherical, or conical shape, or may have other suitable shapes. The configuration of FIG. 3 is illustrative.

If desired, openings may be formed in the surfaces of device 10. For example, a speaker port and optical windows for an ambient light sensor, an infrared proximity sensor, and a depth sensor may be formed in housing 12. A fingerprint sensor, touch sensor button, force-sensitive button, or other sensor that operates through display 14 may, if desired, be formed under a portion of display 14. Device 10 may be free of connector openings or may have an opening for a connector (e.g., a digital data connector, analog signal connector, and/or power connector). Openings in housing 12 may be omitted when power is received wirelessly or is received through contacts that are flush with the surface of device 10 and/or when data is transferred and received wirelessly using wireless communications circuitry in circuitry 22 or through contacts that are flush with the exterior surface of device 10.

Illustrative configurations for antennas in device 10 are shown in FIGS. 4, 5, 6, and 7.

Figure 4:
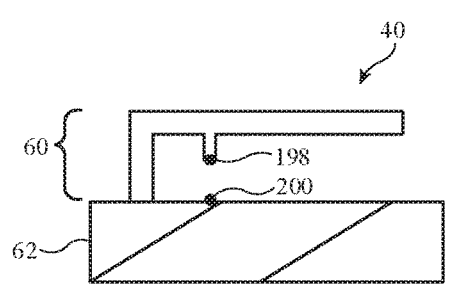
FIGS. 4, 5, 6, and 7 are diagrams of illustrative antennas in an electronic device in accordance with an embodiment.

In the example of FIG. 4, antenna 40 is an inverted-F antenna. Antenna 40 of FIG. 4 may include antenna resonating element 60 and antenna ground 62. The antenna resonating arm forming element 60 may have one or more branches and may run parallel to ground 62 or may have other shapes. The configuration of FIG. 4 is illustrative. Antenna 40 may be fed at an antenna feed formed from positive antenna feed terminal 198 and ground antenna feed terminal 200.

Figure 5:
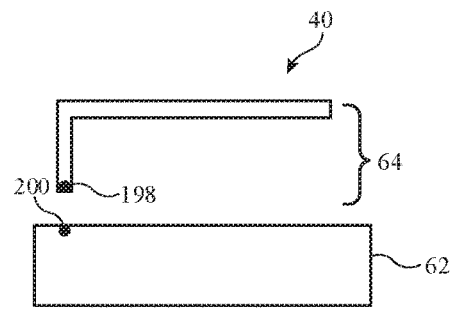

In the example of FIG. 5, antenna 40 is a monopole antenna (e.g., a folded monopole) having monopole antenna resonating element 64 and antenna ground 62. Antenna 40 of FIG. 5 may be fed using an antenna feed formed from positive antenna feed terminal 198 on element 64 and ground antenna feed terminal 200 on antenna ground 62.

Figure 6:
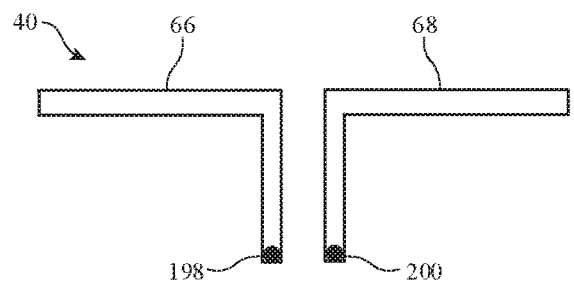

FIG. 6 shows how antenna 40 may be a dipole antenna having dipole antenna resonating elements 66 and 68 coupled respectively to positive antenna feed terminal 198 and ground antenna feed terminal 200.

Figure 7:
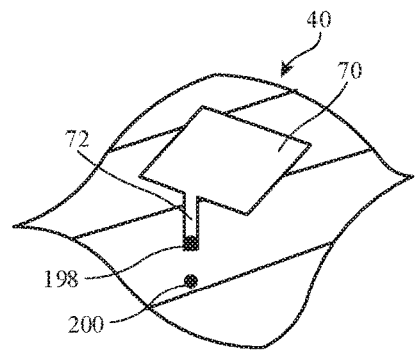

If desired, antenna 40 may be a patch antenna, as shown in FIG. 7. In antenna 40 of FIG. 7, patch antenna resonating element 70 has vertical leg 72, which extends toward an antenna ground plane (ground 62) and that is coupled to positive antenna feed terminal 198. The feed of antenna 40 of FIG. 7 also has a corresponding ground antenna feed terminal 200.

Other types of antenna (e.g., Yagi antennas, slot antennas, other designs, hybrid antennas, antennas formed from multiple antenna resonating elements configured to implement beam steering antenna arrays, etc.) may also be used in device 10. The examples of FIGS. 4, 5, 6, and 7 are illustrative.

Conductive structures for antenna 40 (e.g., the resonating elements and/or antenna grounds of antenna 40) may be formed from metal traces on printed circuits or other substrates, wires, patterned metal foil, metal housing structures (e.g., metal portions of housing 12), and/or other conductive structures in device 10.

Antenna structures (resonating elements, antenna ground structures, etc.) may be formed as part of housing member attachment structure 52. For example, one or more printed circuits may be included in housing member attachment structure 52 and these printed circuits may include metal antenna traces (e.g., metal traces for resonating elements, ground, and/or other portions of antenna 40). In addition to incorporating these antenna structures into housing member attachment structure 52, metal traces and other circuitry for other electrical components may be incorporated into housing member attachment structure 52. For example, metal traces on a printed circuit or other conductive structures associated with force sensor 26, other sensors 16, and/or other input-output devices 24 may be incorporated into housing member attachment structure 52 (e.g., with or without antenna structures for antenna 40).

Figure 8:
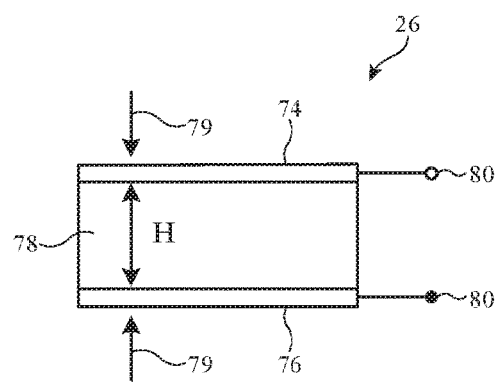
FIG. 8 is a cross-sectional side view of an illustrative force sensor in accordance with an embodiment.

Conductive structures for force sensor 26 may include, for example, capacitive force sensor electrodes. FIG. 8 is a cross-sectional side view of force sensor 26 in an illustrative configuration in which force sensor 26 is a capacitive force sensor having respective first and second capacitive force sensor electrodes 74 and 76. Electrodes 74 and 76 may be electrically coupled to capacitive sensor circuitry (e.g., a capacitive sensor integrated circuit or one or more other components 50 in interior 46) using terminals 80. Compressible dielectric material 78 (e.g., silicone or other elastomeric polymer, foam, or other compressible polymer) may be interposed between electrodes 74 and 76. During operation, compressive force may be applied to sensor 26 in directions 79, thereby compressing material 78 and reducing the separation H between electrodes 74 and 76. The resulting rise in capacitance between electrodes 74 and 76 can be measured by the capacitive sensing circuitry coupled to terminals 80, thereby producing a measurement of the amount of applied force on sensor 26.

Figure 9:
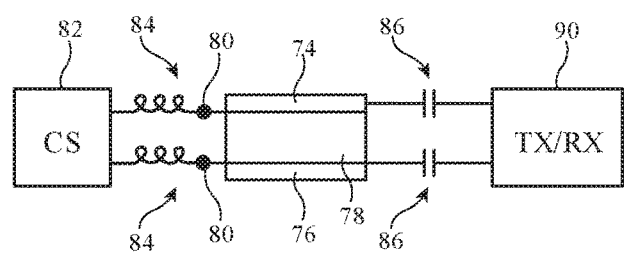
FIG. 9 is a diagram of illustrative antenna and force sensing circuitry in accordance with an embodiment.

FIG. 9 is a circuit diagram showing how a force sensor and antenna may be formed using conductive structures such as first electrode 74 and second electrode 76. As shown in FIG. 9, capacitive sensor circuitry such as capacitive sensor integrated circuit 82 may be coupled to electrodes 74 and 76 using inductors 84. Inductors 84 may allow capacitance measurements to be made by circuit 82 for the capacitive force sensor formed from electrodes 74 and 76 and interposed compressive dielectric material 78. Inductors 84 may help prevent higher frequency signals such as radio-frequency antenna signals associated with operation of radio-frequency transceiver circuitry 90 from reaching circuit 82 and potentially interfering with the operation of circuit 82. Capacitors 86 may be used to couple transceiver 90 to electrodes 74 and 76. In addition to serving as parallel plates in a parallel plate capacitor for a capacitive force sensor, the metal traces of electrodes 74 and 76 (and/or adjacent traces on a shared dielectric substrate such as a shared polymer substrate in a printed circuit) may be patterned to form antenna 40 (e.g., an antenna resonating element and, if desired, an antenna ground). During operation, capacitors 86 allow antenna signals for the antenna to pass to and from transceiver 90, while inductors 84 block antenna signals from circuit 82. During operation of circuit 82, capacitors 86 may block lower-frequency capacitance sensing signals associated with circuit 82 (e.g., to prevent these signals from interfering with use of the antenna by transceiver circuitry 90).

If desired, force sensing structures and/or antenna structures such as the illustrative structures of FIG. 9 may be incorporated into housing attachment structure 52, as shown in FIG. 3.

Figure 10:
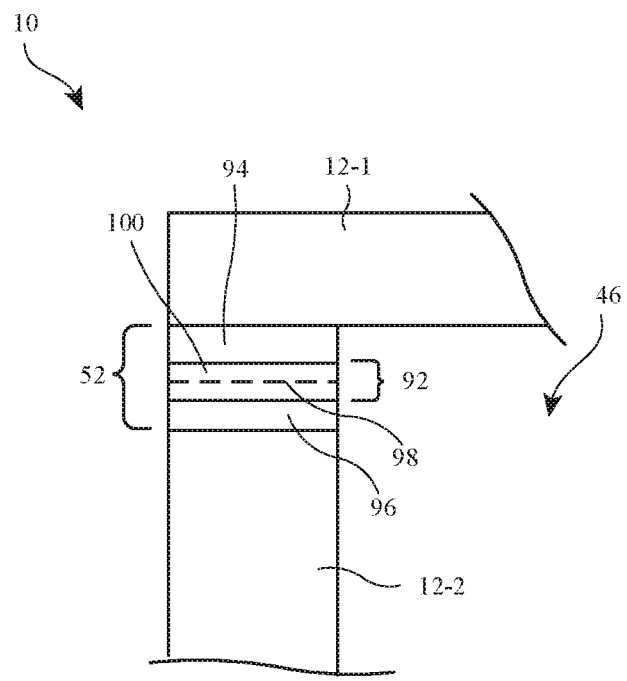
FIG. 10 is a cross-sectional side view of a portion of an illustrative electronic device having a housing member attachment structure with metal traces for forming an antenna or other circuitry in accordance with an embodiment.

Consider, as an example, the illustrative arrangement of FIG. 10. As shown in FIG. 10, first housing member 12-1 may be coupled to second housing member 12-2 using housing member attachment structure 52. Housing member 12-1 may be a display cover layer and housing member 12-2 may include structures forming sidewall W and a rear housing wall, housing member 12-2 may form sidewall W and housing member 12-1 may form a rear wall and/or a sidewall for device 10, and/or housing members 12-1 and 12-3 may form other housing structures. Housing member attachment structure 52 may include a printed circuit such as printed circuit 92 sandwiched between first adhesive layer 94 and second adhesive layer 96. Adhesive layer 94 may attach housing member attachment structure 52 and printed circuit 92 to member 12-1. Adhesive layer 96 may attach housing member attachment structure 52 and printed circuit 92 to member 12-2. In this way, housing member attachment structure 52 may attach members 12-1 and 12-2 together.

Printed circuit 92 may have one or more dielectric substrate layers 100 (e.g., one or more polyimide layers or other layers in a polymer substrate, etc.) and one or more layers of metal traces 98 for forming capacitive sensor electrodes and/or antenna structures (e.g., an antenna resonating element, an antenna ground, etc.). As an example, capacitive sensor electrodes may be omitted from printed circuit 92, metal traces 98 may be configured to form an antenna resonating element for antenna 40, and an antenna ground for antenna 40 may be formed from housing member 12-2 (e.g., a metal sidewall and/or metal rear housing wall) and/or may be formed from other antenna ground structures (e.g., ground traces on printed circuit 92, metal structures in interior 46, etc.). Because antenna 40 is not located deep within interior 46 of device 10, antenna 40 may efficiently transmit and receive antenna signals during operation over a desired range of angles without being blocked by surrounding conductive housing structures.

Figure 11:
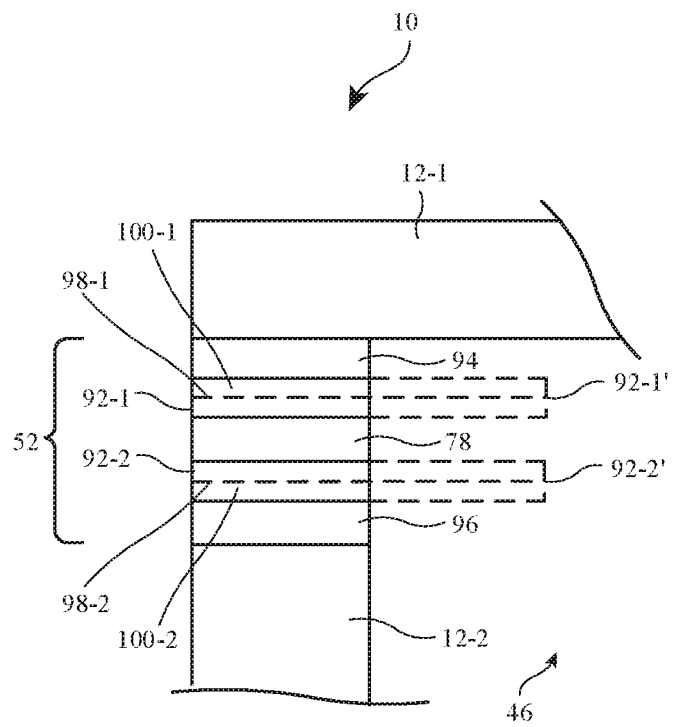
FIG. 11 is a cross-sectional side view of a portion of an illustrative electronic device having a housing member attachment structure with multiple layers of metal traces for forming force sensor structures and other circuitry in accordance with an embodiment.

Another illustrative arrangement is shown in FIG. 11. As with the example of FIG. 10, first housing member 12-1 of FIG. 11 may be coupled to second housing member 12-2 of FIG. 11 using housing member attachment structure 52. As shown in FIG. 11, housing member attachment structure 52 may include multiple printed circuits. For example, housing member attachment structure 52 may include first printed circuit 92-1, which has one or more substrate layer(s) 100-1 and one or more layers of metal traces 98-1, and second printed circuit 92-2, which has one or more substrates layers 100-2 and one or more layers of metal traces 98-2. Printed circuits 92-1 and 92-2 may be attached to opposing sides of compressible member 78 (e.g., an elastomeric material such as silicone or other polymer, foam, and/or other compressible dielectric material) using the material of member 78 and/or interposed adhesive layers. Printed circuit 92-1 may be coupled to member 12-1 using adhesive layer 94. Printed circuit 92-2 may be coupled to member 12-2 using adhesive layer 96.

Metal traces 98-1 and/or 98-2 may be configured to form force sensor structures and/or antenna structures. For example, metal traces 98-1 may form a first capacitive sensor electrode for sensor 26 and metal traces 98-2 may form a second capacitive sensor electrode for sensor 26 as shown by electrodes 74 and 76 of FIG. 9, which are coupled to capacitive sensor circuit 82. Traces 98-1 and/or traces 98-2 may also be used in forming an antenna resonating element or other antenna structures for antenna 40 and may be coupled to transceiver circuitry 90 as shown in FIG. 9.

If desired, printed circuit 92-1 and/or printed circuit 92-2 may have inwardly directed protrusions such as portion 92-1' and/or protrusion 92-2' that protrude into interior 46. In this interior location, antenna 40 may operate by transmitting and receiving antenna signals through dielectric structures in housing 12 and/or dielectric material in housing member attachment structure 52.

During operation, the antenna formed using housing member attachment structure 52 may be used to handle wireless communications for device 10. Control circuitry 20 may also use force sensor 26 (e.g., the force sensor formed from electrodes 74 and 76, which may be formed in printed circuits 92-1 and 92-2 of FIG. 11) to gather force sensor data. For example, force measurements (e.g., measurements of compressive force on compressible dielectric member 78 of FIG. 11) may be made to detect when a user is pressing on member 12-1 with a finger or other external object, may be made to detect other user force input, and/or may be made to measure other forces.

Figure 12:
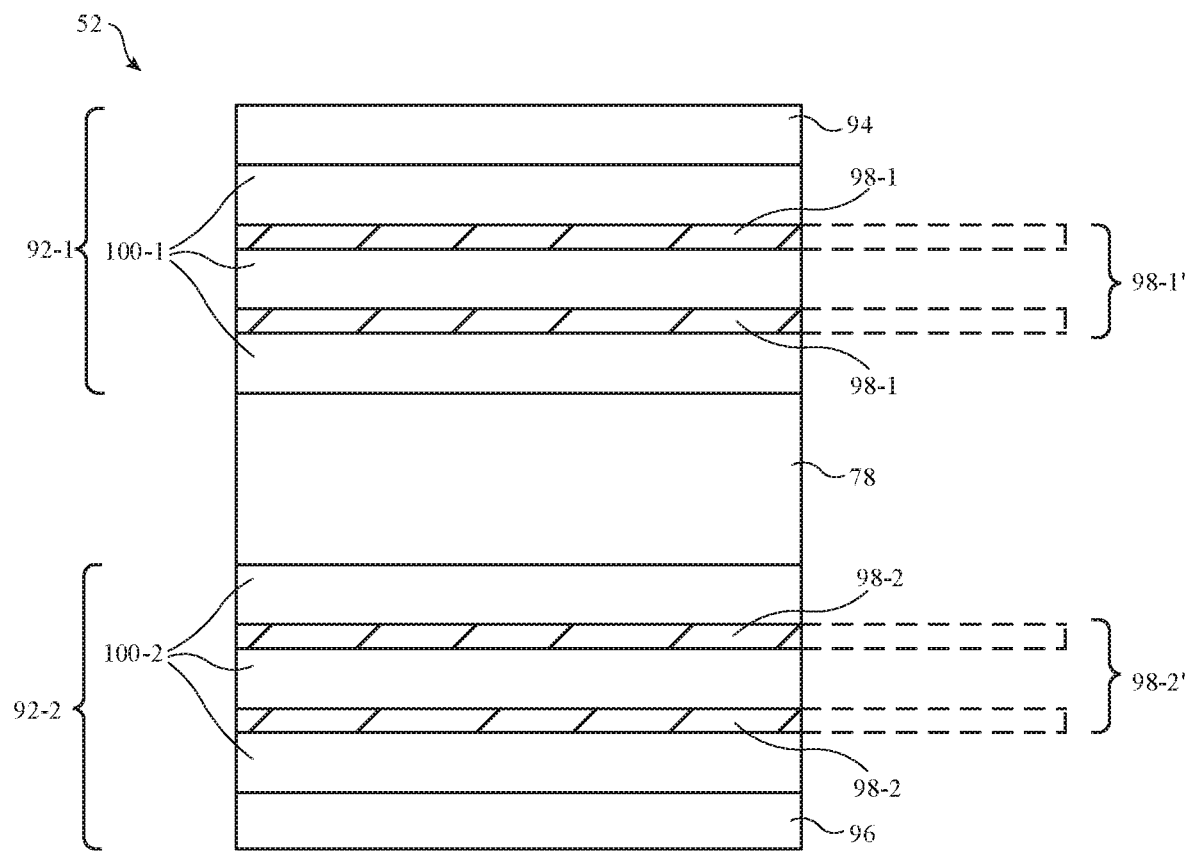
FIG. 12 is a cross-sectional side view of an illustrative housing attachment structure having printed circuit layers with multiple layers of metal traces for forming force sensor structures and antenna structures in accordance with an embodiment.

Another illustrative configuration for housing member attachment structure 52 is shown in FIG. 12. In the example of FIG. 12, printed circuit 92-1 has three polymer substrate layers 100-1 surrounding two embedded layers of metal traces 98-1. Printed circuit 92-2 has three polymer substrate layers 100-2 surrounding two embedded layers of metal traces 98-2. These substrate layers and metal traces may be extended inwardly (e.g., into interior 46), as illustrated by protruding metal traces 98-1' and 98-2' of FIG. 12 and as described in connection with protruding portion 92-1' of FIG. 11.

With one illustrative embodiment, layers 100-1 and 100-2 are formed from a dielectric such as polyimide or other polymer flexible printed circuit substrate material. The outermost (upper) layer of metal traces 98-1 may be used in forming grounding and signal routing paths (sometimes referred to as ground and routing or ground and routing structures) for sensor 26. The innermost (lower) layer of metal traces 98-1 may be used in forming electrode 74. The outermost (lower) layer of metal traces 98-2 may be used in forming grounding and signal routing paths for sensor 26. The innermost (upper) layer of metal traces 98-2 may be used in forming electrode 76.

Antenna 40 may be formed in the patterned metal of layers 98-1 and/or 98-2 of FIG. 12 and may be located in the joint formed by structures 52 between opposing housing members 12-1 and 12-2 and/or may be formed from metal traces in adjacent portions of printed circuits 92-1 and/or 92-2 such as metal traces in protruding portions 98-1' and/or 98-2'. In one illustrative configuration, an antenna resonating element and/or other antenna structures for antenna 40 is formed from the same metal traces that are used in forming electrode 74 and/or 76. For example, some or all of an antenna resonating element may form some or all of a capacitive force sensor electrode and these conductive structures may share a common polymer substrate and/or other shared supporting structures. In another illustrative configuration, an antenna resonating element or other antenna structures for antenna 40 may be separate from electrodes 74 and 76. For example, a printed circuit in structure 52 may have a first portion with a polymer substrate that supports metal traces forming electrode 74 and/or 76 and may have a second portion (e.g., a protrusion that protrudes towards interior 46) in which a protruding portion of the same polymer substrate supports metal traces that form an antenna resonating element for antenna 40.

Figure 13:
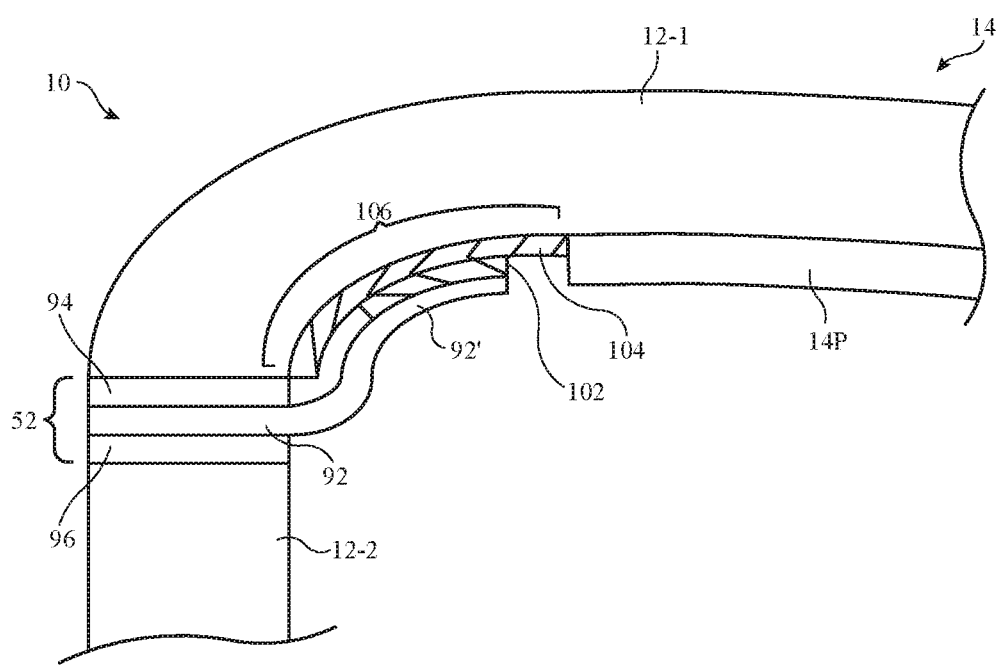
FIG. 13 is a cross-sectional side view of a portion of an illustrative electronic device with a flexible printed circuit that forms part of a housing member attachment structure and that has a portion that is coupled to the underside of a display cover layer in accordance with an embodiment.

FIG. 13 is a cross-sectional side view of a portion of an illustrative electronic device 10 that includes housing members 12-1 and 12-2 that have been joined using housing member attachment structure 52. Structure 52 may include adhesive layers 94 and 96 for coupling printed circuit 92 between opposing housing surfaces on opposing portions of housing members 12-1 and 12-2 and thereby attaching housing members 12-1 and 12-2. Housing member 12-1 may be a layer of clear material such as clear glass, sapphire, or other clear material that forms a display cover layer for an array of display pixels (see, e.g., pixel array 14P of display 14, which may display an image that is viewable through housing member 12-1). Housing member 12-2 may be formed from clear materials (e.g., glass, etc.) and/or opaque materials (e.g., metal, etc.). As shown in FIG. 13, the inner surface of housing member 12-1 in edge area 106 may be covered with a layer of opaque masking material such as black ink 104 to hide internal components from view. Adhesive layer 102 may be used to attach inwardly protruding portion 92' of printed circuit 92 to the inner surface of member 12-1 in area 106. Antenna 40 may be formed from metal traces in printed circuit 92 (e.g., in the portion of printed circuit 92 that protrudes into edge area 106).

Figure 14:
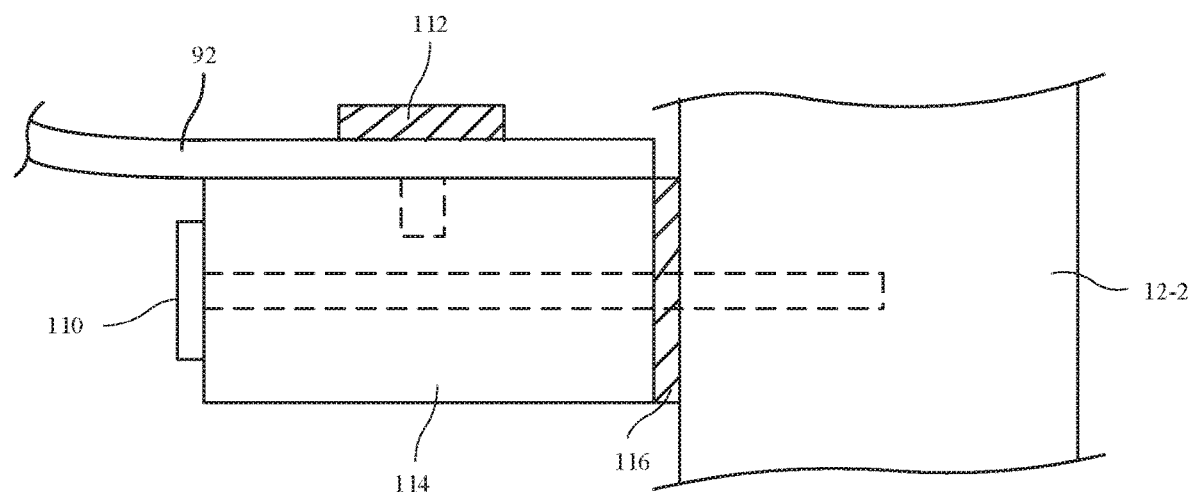
FIG. 14 is a cross-sectional side view of structures for coupling an antenna resonating element on a flexible printed circuit to a conductive housing structure such as a metal housing wall in accordance with an embodiment.

It may be desirable to ground traces on printed circuit 92 to housing 12. For example, member 12-2 of housing 12 may be formed of metal and may serve as antenna ground. Ground antenna feed terminal 100 may be shorted to housing member 12-2 using a signal path formed from metal traces in printed circuit 92. An illustrative arrangement for electrically coupling antenna circuitry on printed circuit 92 to housing member 12-2 is shown in FIG. 14. As shown in FIG. 14, a support structure such as structure 114 may be used to support a tail portion of flexible printed circuit 92. The rest of flexible printed circuit 92 may, if desired, form part of housing member attachment structure 52 and may be sandwiched between opposing portions of housing members 12-1 and 12-2. Support structure 114 may be formed from one or more metal members and may be shorted to housing member 12-2. A coating such as coating 116 may be formed on support structure 114 to help form a low-resistance Ohmic contact between structure 114 and housing member 12-2. Coating 116 may be formed from a metal such as gold that is resistant to oxidation. Screw 110 or other attachment mechanisms (e.g., conductive adhesive, solder, welds, etc.) may be used to mechanically and electrically couple support structure 114 to housing member 12-2. Screw 112 or other attachment mechanisms may be use to couple the metal traces in printed circuit 92 to support structure 114 and thereby electrically couple the antenna structures of printed circuit 92 to housing member 12-2. Other arrangements may be used for coupling signal paths on printed circuits such as printed circuit 92 to housing 12, if desired. The arrangement of FIG. 14 is illustrative.

Figure 15:
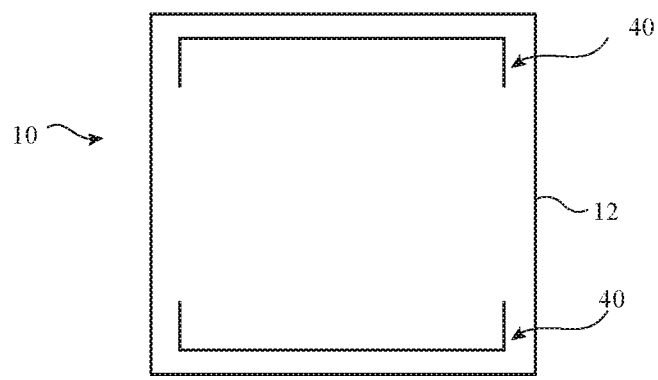
FIGS. 15, 16, and 17 are top views of illustrative electronic devices with antennas in accordance with illustrative embodiments.
Figure 16:
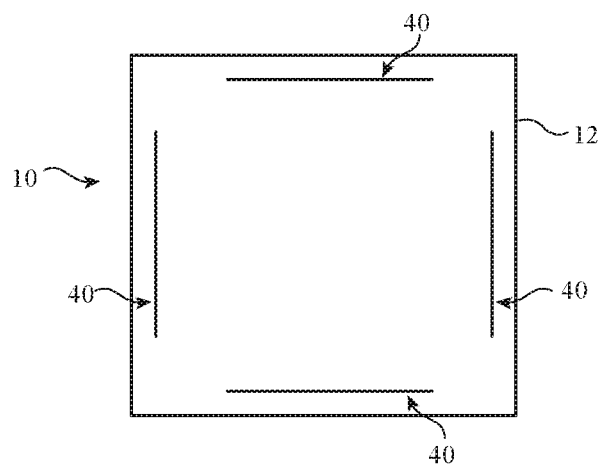
Figure 17:
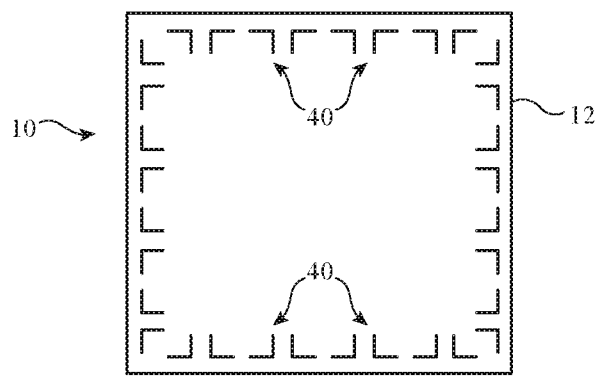

FIGS. 15, 16, and 17 are top views of device 10 showing illustrative configurations for incorporating antennas 40 into device 10 using housing member attachment structure 52.

In the example of FIG. 15, metal traces in housing attachment structure 52 have been used to form first and second antennas 40 running along opposing upper and lower edges (and parts of the left and right edges) of housing 12. These antennas may be used, for example, in an antenna diversity scheme in which control circuitry 20 dynamically selects an antenna for use based on received signal strength information or other suitable antenna selection criteria.

In the example of FIG. 16, there are four antennas 40 formed from the metal traces in housing member attachment structure 52. Each of the four antennas 40 in this example has a respective antenna resonating element that runs along a respective edge of housing 12.

As shown in FIG. 17, device 10 may include antennas 40 that are arranged in one or more phased antenna arrays configured to perform beam steering operations. Antennas 40 may be formed from housing member attachment structure 52. Antennas 40 of FIG. 17 may run along one or more of the edges of housing 12. Antennas 40 may be dipole millimeter wave antennas, patch antennas, Yagi antennas, and/or other antennas.

Figure 18:
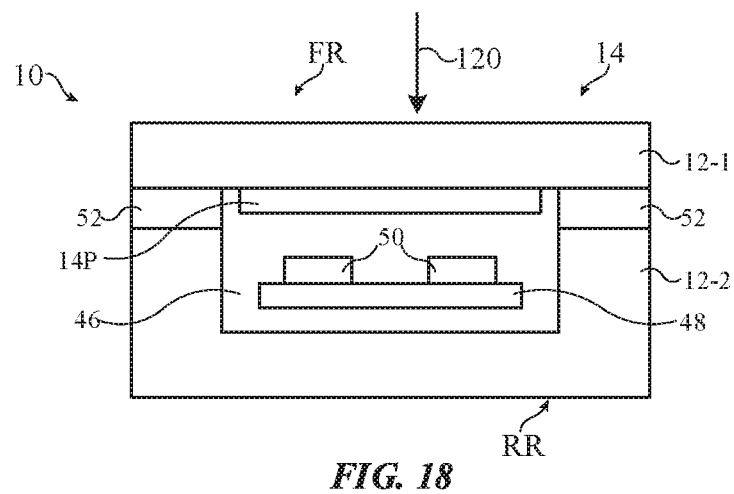
FIGS. 18, 19, and 20 are cross-sectional side views of electronic devices with illustrative housing member attachment structures in accordance with embodiments.
Figure 19:
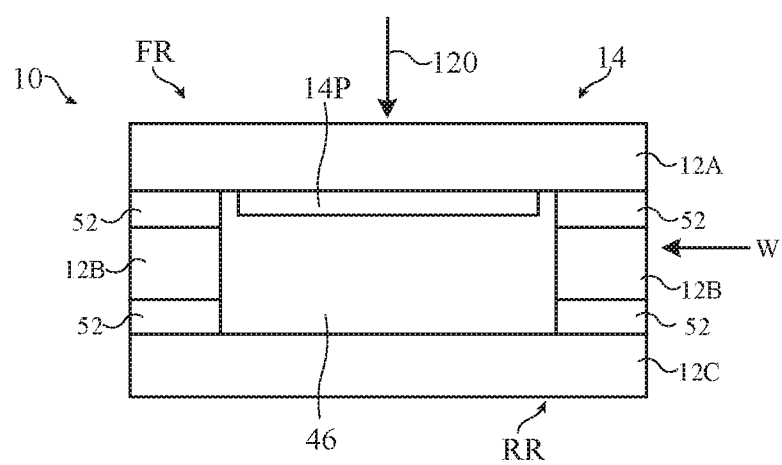
Figure 20:
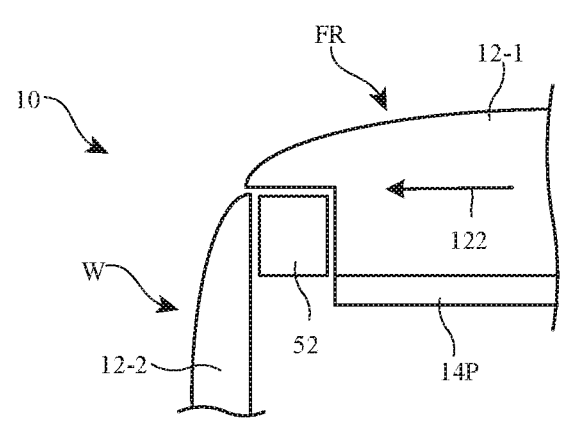

FIGS. 18, 19, and 20 are cross-sectional side views of device 10 showing illustrative locations for housing member attachment structure 52 (e.g., a housing member attachment structure that includes antenna resonating element(s) for one or more antennas 40 and one or more force sensors).

In the example of FIG. 18, housing member 12-2 has portions that extend upward from a rear wall portion to form sidewall W. Housing attachment structure 52 may be formed between peripheral portions of housing member 12-1 (e.g., a display cover layer) and housing member 12-2. A force sensor formed from housing attachment structure 52 may sense downward pressure in direction 120.

In the example of FIG. 19, housing 12 includes a display cover layer formed from housing member 12A, a sidewall W formed from housing member 12B, and a rear housing wall formed from housing member 12C. Housing member attachment structures 52 may be interposed between member 12A and 12B and/or may be interposed between member 12B and 12C. Downward force in direction 120 may be sensed using force sensors 26 in one or both of the housing member attachment structures.

In the example of FIG. 20, housing member attachment structure 52 has been formed around the periphery of housing member 12-1 (e.g., a display cover layer over pixel array 14P) and may be configured to detect shear forces (e.g., pressure that pushes member 12-1 against the inner surface of housing member 12-2 in direction 122, thereby compressing compressible force sensor dielectric material in structure 52).

Figure 21:
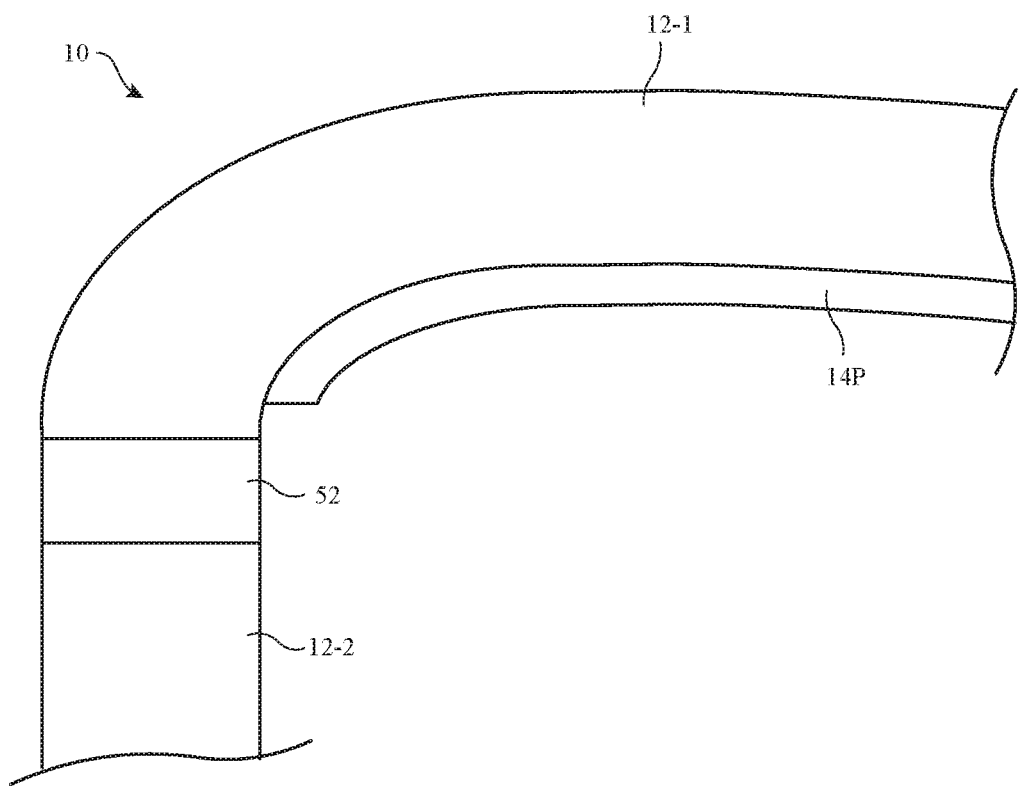
FIG. 21 is a cross-sectional side view of a portion of an illustrative electronic device with a flexible display that has bent portions in accordance with an embodiment.

FIG. 21 is a cross-sectional side view of a portion of device 10 in an illustrative configuration in which pixel array 14P is formed from a flexible display layer (e.g., a flexible organic light-emitting diode display substrate). As shown in FIG. 21, pixel array 14P may be bent. For example, pixel array 14P may be bent along one or more peripheral edges of pixel array 14P and/or across the middle of pixel array 14P. This allows pixel array 14P to conform to a curved inner surface of a display cover layer formed from housing member 12-1. Housing member 12-1 may be coupled to housing member 12-2 using housing member attachment structure 52, which may include metal traces for forming antenna 40 and, if desired, metal traces for forming force sensor 26.

The foregoing is merely illustrative and various modifications can be made to the described embodiments. The foregoing embodiments may be implemented individually or in any combination.

What is claimed is:

1. An electronic device, comprising:
   radio-frequency transceiver circuitry;
   a first housing member;
   a second housing member; and
   a housing member attachment structure that attaches the first housing member to the second housing member, wherein the housing member attachment structure includes a dielectric substrate and metal traces on the dielectric substrate and wherein the metal traces are configured to form an antenna resonating element that provides antenna signals to the radio-frequency transceiver circuitry.

2. The electronic device defined in claim 1 wherein the housing member attachment structure comprises adhesive that attaches the first housing member to the second housing member.

3. The electronic device defined in claim 2 wherein the housing member attachment structure comprises a force sensor.

4. The electronic device defined in claim 3 further comprising a band coupled to the second housing member.

5. The electronic device defined in claim 4 wherein the second housing member comprises a metal sidewall having a surface that contacts the adhesive.

6. The electronic device defined in claim 3 wherein the force sensor comprises a capacitive force sensor.

7. The electronic device defined in claim 3 wherein the force sensor has an electrode on the dielectric substrate.

8. The electronic device defined in claim 1 wherein the first housing member forms a sidewall and wherein the second housing member comprises a rear housing wall.

9. The electronic device defined in claim 1 further comprising an array of pixels, wherein the first housing member comprises a transparent display cover layer that overlaps the array of pixels, wherein the second housing member comprises a sidewall portion, and wherein the dielectric substrate has a portion between the transparent display cover layer and the sidewall portion.

10. The electronic device defined in claim 9 wherein the dielectric substrate forms part of a flexible printed circuit having a portion that extends into an interior region formed by the first and second housing members and wherein the antenna resonating element is on the portion that extends into the interior region.

11. The electronic device defined in claim 1 further comprising:
    a band coupled to the second housing member; and
    a flexible organic light-emitting diode display, wherein the first housing member forms a display cover layer that overlaps the flexible organic light-emitting diode display, wherein the second housing member has a metal sidewall, and wherein the housing member attachment structure comprises adhesive that attaches an edge portion of the display cover layer to the metal sidewall.

12. The electronic device defined in claim 11 wherein the housing member attachment structure has a first printed circuit that includes the metal traces and has a second printed circuit, wherein the electronic device further comprises a capacitive force sensor having first and second capacitive force sensor electrodes, and wherein the first capacitive force sensor electrode is in the first printed circuit.

13. The electronic device defined in claim 12 wherein the capacitive force sensor comprises a layer of compressible material between the first and second capacitive force sensor electrodes that is configured to compress in response to application of force that presses the display cover layer and the metal sidewall together.

14. The electronic device defined in claim 13 wherein the first printed circuit includes a first metal layer forming ground and routing and a second metal layer forming the first capacitive force sensor electrode and wherein the second printed circuit includes a third metal layer forming ground and routing and a fourth metal layer forming the second capacitive force sensor electrode.

15. The electronic device defined in claim 14 wherein the adhesive comprises a first adhesive layer between the first metal layer and the first housing member and a second adhesive layer between the third metal layer and the second housing member, wherein the second metal layer is between the first metal layer and the layer of compressible material, and wherein the fourth metal layer is between the third metal layer and the layer of compressible material.

16. The electronic device defined in claim 1, wherein the housing member attachment structure includes adhesive layers and an elastomeric member, and includes first and second capacitive force sensor electrodes on opposing sides of the elastomeric member.

17. The electronic device defined in claim 1, wherein the housing member attachment structure includes a compressible member having first and second opposing sides, the dielectric substrate is on the first side of the compressible member, and the housing member attachment structure includes an additional dielectric substrate on the second side of the compressible member and includes additional metal traces on the additional dielectric substrate.

18. The electronic device defined in claim 17, wherein the metal traces are configured to form a first sensor electrode on the first side of the compressible member, and the additional metal traces are configured to form a second sensor electrode on the second side of the compressible member.

* * * * *